(12) United States Patent
Sakurai et al.

(10) Patent No.: US 8,119,758 B2
(45) Date of Patent: Feb. 21, 2012

(54) HEAT-CONDUCTIVE SILICONE COMPOSITION AND CURED PRODUCT THEREOF

(75) Inventors: Ikuo Sakurai, Annaka (JP); Nobuaki Matsumoto, Annaka (JP); Kei Miyoshi, Annaka (JP); Kunihiro Yamada, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 874 days.

(21) Appl. No.: 11/846,862

(22) Filed: Aug. 29, 2007

(65) Prior Publication Data

US 2008/0057325 A1    Mar. 6, 2008

(30) Foreign Application Priority Data

Aug. 30, 2006    (JP) .................... 2006-233344

(51) Int. Cl.
*C08G 77/12* (2006.01)
*C08L 83/04* (2006.01)
*C08K 3/00* (2006.01)
*C08K 5/541* (2006.01)
*C08K 5/5419* (2006.01)

(52) U.S. Cl. ............ 528/35; 528/10; 528/31; 528/32

(58) Field of Classification Search .......... 528/35, 528/10, 31, 32
See application file for complete search history.

(56) References Cited

U.S. PATENT DOCUMENTS

| 5,352,731 | A | 10/1994 | Nakano et al. | |
|---|---|---|---|---|
| 6,306,957 | B1 | 10/2001 | Nakano et al. | |
| 2002/0010245 | A1 * | 1/2002 | Enami et al. | 524/430 |
| 2004/0242762 | A1 | 12/2004 | Horikoshi et al. | |
| 2004/0254275 | A1 | 12/2004 | Fukui et al. | |
| 2005/0261140 | A1 | 11/2005 | Yamada et al. | |
| 2006/0135687 | A1 | 6/2006 | Fukui | |
| 2007/0042533 | A1 | 2/2007 | Endo et al. | |
| 2007/0149834 | A1 | 6/2007 | Endo et al. | |
| 2007/0293624 | A1 | 12/2007 | Matsumoto et al. | |
| 2008/0213578 | A1 | 9/2008 | Endo et al. | |

FOREIGN PATENT DOCUMENTS

| EP | 0 024 498 A1 | 3/1981 |
|---|---|---|
| EP | 0 032 050 A2 | 7/1981 |
| JP | 47-32400 | 11/1972 |
| JP | 64-69661 | 3/1989 |
| JP | 2000-256558 | 9/2000 |
| JP | 3290127 | 3/2002 |
| JP | 2004-210856 | 7/2004 |
| JP | 2004-262972 | 9/2004 |
| JP | 2004-352947 | 12/2004 |
| JP | 2005325212 A * | 11/2005 |
| JP | 2006-137930 | 6/2006 |
| JP | 2007-51227 | 3/2007 |
| JP | 2007-177001 | 7/2007 |
| JP | 2007-277387 | 10/2007 |
| JP | 2008-19426 | 1/2008 |
| JP | 2008-38137 | 2/2008 |
| WO | WO 02/092693 A1 | 11/2002 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

Provided is a heat-conductive silicone composition, including: (A) 100 parts by volume of an organopolysiloxane having a specific structure, (B) 0.1 to 50 parts by volume of an organosilicon compound that functions as a wetter and contains a triorganooxysilyl group bonded to one terminal via an alkylene group that may be branched, (C) 100 to 2,500 parts by volume of a heat-conductive filler, and (D) an effective quantity of a curing agent. Also provided is a heat-conductive silicone cured product obtained by curing this composition. The heat-conductive silicone composition, even when filled with a large quantity of a heat-conductive filler in order to provide superior thermal conductivity, exhibits a minimal increase in viscosity or plasticity, and retains favorable handling properties and moldability. The heat-conductive silicone cured product exhibits excellent flexibility even when filled with a large quantity of a heat-conductive filler. Heat generated by a heat-generating electronic component can be dissipated into a heat-radiating component by sandwiching the cured product between the heat-generating electronic component and the heat-radiating component.

8 Claims, No Drawings

HEAT-CONDUCTIVE SILICONE COMPOSITION AND CURED PRODUCT THEREOF

BACKGROUND OF THE INVENTION

1. Field of the Invention

The present invention relates to a heat-conductive silicone composition which, even when filled with a large quantity of a heat-conductive filler in order to provide superior thermal conductivity, shows a minimal increase in viscosity or plasticity, and still exhibits favorable handling properties and moldability. The invention also relates to a heat-conductive silicone cured product which, even when filled with a large quantity of a heat-conductive filler, exhibits excellent flexibility.

2. Description of the Prior Art

Many electronic components generate heat during use, and in order to ensure that those electronic components function satisfactorily, heat must be conducted away from the electronic components. Particularly in the case of integrated circuit elements such as the CPUs used in personal computers, increases in the operating frequency have lead to increased heat generation, and dealing with this heat has become a significant problem.

Many methods have been proposed for removing this heat. Particularly in the case of electronic components that generate a large quantity of heat, methods have been proposed in which the heat is dissipated by placing a heat-conductive material such as a heat-conductive sheet or heat-conductive grease between the electronic component and another member such as a heat sink (see patent reference 1 and patent reference 2).

Furthermore, patent reference 3 discloses a composition in which from 60 to 500 parts by weight of silica and a heat-conductive powder of silver, gold or silicon or the like are added to an addition-curable silicone rubber, yielding a heat-radiating material that can be used in locations where insulation is not required.

However, these heat-conductive materials all have thermal conductivity values lower than 1.5 W/mK, and if a large quantity of a heat-conductive filler is added in order to improve the thermal conductivity, then either the fluidity deteriorates in the case of a liquid silicone composition, or the plasticity increases in the case of a millable silicone composition. Either result causes a dramatic deterioration in the handling properties and moldability of the composition, and cured products formed from the compositions also suffer from increased hardness and brittleness.

In an attempt to resolve this problem, patent reference 4 discloses highly heat-conductive rubber and plastic compositions filled with an alumina filler consisting of 10 to 30% by weight of alumina particles with an average particle size of not more than 5 µm, and the remainder of spherical corundum particles with no cutting edges and with an average particle size for a single particle of at least 10 µm. Furthermore, patent reference 5 discloses a heat-conductive silicone rubber composition consisting of a base formed from a combination of a gum-type organopolysiloxane with an average polymerization degree of 6,000 to 12,000 and an oily organopolysiloxane with an average polymerization degree of 200 to 2,000, and a spherical aluminum oxide powder, which is added in a ratio of 500 to 1,200 parts by weight of the aluminum oxide powder per 100 parts by weight of the base polymer components.

However even when using these methods, if a high degree of filling of at least 70 volume % of aluminum oxide is used, then there is a limit to the improvement in moldability that can be achieved by simply adjusting the particle combinations or altering the viscosity of the silicone base.

Accordingly, techniques have been developed in which the surface of the inorganic filler that acts as the heat-conductive filler is treated with a surface treatment agent such as a silane coupling agent, thereby improving the dispersibility of the filler within the silicone base polymer, and enabling a higher degree of filling. For example, patent reference 6 discloses a heat-conductive silicone rubber composition containing an inorganic filler that has been surface-treated with a silane coupling agent comprising an aliphatic long-chain alkyl group and a methoxy or ethoxy group, and also discloses a heat-radiating sheet produced using the heat-conductive silicone rubber composition. However, because these types of silane-based treatment agents have comparatively low molecular weights they are prone to volatilization, meaning the viscosity or plasticity of the obtained silicone compositions tends to increase over time, and the cured products produced from the compositions suffer from increased hardness over time. If the surface treatment is conducted using the type of alkoxy group-containing organopolysiloxane disclosed in patent reference 7 and patent reference 8, then although the problem of volatilization of the surface treatment agent over time can be suppressed, because the molecular weight of the treatment agent is comparatively large, the surface treatment action on the inorganic filler is inferior to that provided by an equal mass and equal volume of a silane-based treatment agent. As a result, a much larger quantity of the treatment agent is required to achieve a satisfactory effect. Accordingly, the development of a surface treatment agent for a heat-conductive filler that suffers minimal variation over time and yields a favorable effect with only a small quantity, a heat-conductive silicone composition that uses such a surface treatment agent, and a cured product of such a composition has been keenly sought.

[Patent Reference 1] JP 47-32400 A
[Patent Reference 2] EP 0 024 498 A1
[Patent Reference 3] EP 0 032 050 A2
[Patent Reference 4] JP 1-69661 A
[Patent Reference 5] U.S. Pat. No. 5,352,731
[Patent Reference 6] JP 3290127 B2
[Patent Reference 7] U.S. Pat. No. 6,306,957
[Patent Reference 8] US 2006/0135687 A1

SUMMARY OF THE INVENTION

In order to address these problems, an object of the present invention is to provide a heat-conductive silicone composition which, even when filled with a large quantity of a heat-conductive filler in order to provide superior thermal conductivity, exhibits a minimal increase in viscosity or plasticity, and retains favorable handling properties and moldability, and also to provide a heat-conductive silicone cured product that exhibits excellent flexibility even when filled with a large quantity of a heat-conductive filler.

As a result of intensive investigation aimed at achieving the above object, the inventors of the present invention developed a surface treatment agent for a heat-conductive filler that exhibits favorable effects with a small quantity and exhibits minimal degradation over time, and discovered that by using this surface treatment agent, a heat-conductive silicone composition could be produced which, even when filled with a large quantity of a heat-conductive filler, exhibits a minimal increase in viscosity or plasticity, and retains favorable handling properties and moldability. Moreover, the inventors also discovered that by using the surface treatment agent, a heat-conductive silicone cured product could be produced that exhibits excellent flexibility even when filled with a large quantity of a heat-conductive filler, and based on these discoveries, they were able to complete the present invention.

In other words, a first aspect of the present invention provides a heat-conductive silicone composition, comprising:

(A) 100 parts by volume of an organopolysiloxane represented by an average composition formula (1) shown below:

(wherein, $R^1$ represents identical or different, unsubstituted or substituted monovalent hydrocarbon groups of 1 to 18 carbon atoms, and a represents a number within a range from 1.8 to 2.2), (B) 0.1 to 50 parts by volume of an organosilicon compound represented by a general formula (2) shown below:

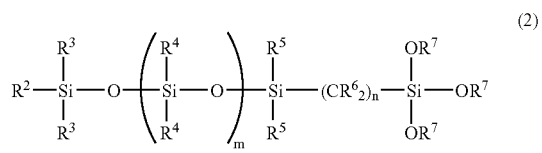

(wherein, $R^2$ represents an unsubstituted or substituted alkyl group, alkenyl group or aryl group, each $R^3$ represents, independently, an unsubstituted or substituted alkyl group, alkenyl group or aryl group, $R^4$ and $R^5$ each represent identical or different, unsubstituted or substituted monovalent hydrocarbon groups, each $R^6$ represents, independently, a hydrogen atom, or an unsubstituted or substituted monovalent hydrocarbon group, each $R^7$ represents, independently, an unsubstituted or substituted alkyl group, alkoxyalkyl group, alkenyl group or acyl group, m represents an integer from 0 to 4, and n represents an integer from 2 to 20), (C) 100 to 2,500 parts by volume of a heat-conductive filler, and (D) an effective quantity of a curing agent.

A second aspect of the present invention provides a heat-conductive silicone cured product obtained by curing the above composition.

A third aspect of the present invention provides a method for dissipating heat generated by a heat-generating electronic component into a heat-radiating component, comprising the steps of:

applying the above cured product to a surface of the heat-generating electronic component, and mounting the heat-radiating component on the applied cured product to sandwich the cured product between the heat-generating electronic component and the heat-radiating component, thereby dissipating the heat into the heat-radiating component.

The heat-conductive silicone composition of the present invention exhibits a minimal increase in viscosity or plasticity even when filled with a large quantity of a heat-conductive filler in order to provide superior thermal conductivity, and consequently is able to offer excellent thermal conductivity while still retaining favorable handling properties and moldability. Furthermore, a cured product of the composition combines a high degree of thermal conductivity with excellent flexibility. Moreover, the composition also exhibits minimal degradation over time. Accordingly, the composition can be readily applied to heat-generating electronic components such as CPUs or the like, and to heat-radiating components such as heat sinks and the like, the contact thermal resistance can be favorably reduced, and the reliability of the composition in terms of degradation over time is also favorable. As a result, by using the heat-conductive silicone composition of the present invention or a cured product thereof at those locations within an electronic device that require heat dissipation, the heat can be radiated away rapidly, the functions of the electronic device can be executed favorably, and the long-term reliability of the electronic device can be improved.

DETAILED DESCRIPTION OF THE PREFERRED EMBODIMENTS

A more detailed description of the present invention is presented below. In the present invention, quantities expressed using the units "parts by volume", viscosity values, and kinematic viscosity values all refer to values measured at 25° C. Furthermore, "Me" represents a methyl group.

[Component (A)]

The component (A) is an organopolysiloxane represented by an average composition formula (1) shown below:

(wherein, $R^1$ represents identical or different, unsubstituted or substituted monovalent hydrocarbon groups of 1 to 18 carbon atoms, and a represents a number within a range from 1.8 to 2.2).

The component (A) is the base polymer of the polymer components within the composition of the present invention and the cured product of the composition. The component (A) may use either a single compound, or a combination of two or more different compounds.

$R^1$ represents identical or different, unsubstituted or substituted monovalent hydrocarbon groups of 1 to 18 carbon atoms. Suitable examples of $R^1$ include alkyl groups such as a methyl group, ethyl group, propyl group, isopropyl group, butyl group, t-butyl group, pentyl group, hexyl group, octyl group, decyl group, dodecyl group, tetradecyl group, hexadecyl group, or octadecyl group; cycloalkyl groups such as a cyclopentyl group or cyclohexyl group; alkenyl groups such as a vinyl group, allyl group or butenyl group; aryl groups such as a phenyl group, tolyl group, xylyl group or naphthyl group; aralkyl groups such as a benzyl group, 2-phenylethyl group or 2-methyl-2-phenylethyl group; and halogenated hydrocarbon groups such as a chloromethyl group, bromoethyl group, 3,3,3-trifluoropropyl group, 2-(perfluorobutyl) ethyl group, 2-(perfluorooctyl)ethyl group, or p-chlorophenyl group. Compounds in which all of the $R^1$ groups are methyl groups, or in which from 0 to 99.5 mol % of the $R^1$ groups are methyl groups, and the remaining $R^1$ groups are phenyl groups, alkyl groups of 6 to 18 carbon atoms, vinyl groups, 3,3,3-trifluoropropyl groups, or a mixture or two or more of these groups are particularly preferred.

The aforementioned a represents a number within a range from 1.8 to 2.2, and is even more preferably a number from 1.9 to 2.1.

Examples of suitable groups for blocking the molecular chain terminals of the organopolysiloxane include alkyl groups, alkenyl groups, aryl groups, a hydroxyl group, and hydrolyzable groups, although this is not a restrictive list.

There are no particular restrictions on the polymerization degree of the organopolysiloxane of the component (A), although this polymerization degree is preferably within a range from 20 to 12,000, and even more preferably from 50 to 10,000. Accordingly, organopolysiloxanes ranging from an oil-like state to a gum-like state can be used as the component (A), and the resulting composition of the present invention can be prepared as either a liquid composition or a millable composition.

In those cases where the composition of the present invention is a liquid composition, there are no particular restrictions on the kinematic viscosity of the component (A) at 25° C., although this value is preferably within a range from 10 to 500,000 mm²/s, and is even more preferably from 30 to 50,000 mm²/s. Provided the kinematic viscosity falls within the above range, the fluidity of the composition of the present invention can be favorably maintained, meaning the handling properties are favorable, and the physical properties of the resulting cured product are also more readily maintained.

As described below, the organopolysiloxane may be selected so as to be best suited to the curing mechanism of the composition.

In those cases where the composition of the present invention is a hydrosilylation reaction curing composition, the component (A) typically comprises an organopolysiloxane having an average of at least 0.1 silicon atom-bonded alkenyl groups within each molecule, preferably comprises an organopolysiloxane having an average of at least 0.5 silicon atom-bonded alkenyl groups within each molecule, and most preferably comprises an organopolysiloxane having an average of at least 0.8 silicon atom-bonded alkenyl groups within each molecule. The reason for this requirement is that if the average value of silicon atom-bonded alkenyl groups within each molecule is less than the lower limit of the above range, then the resulting composition may become difficult to cure satisfactorily. Examples of the silicon atom-bonded alkenyl group within the organopolysiloxane include a vinyl group and an allyl group, although a vinyl group is preferred.

Examples of these types of organopolysiloxanes that contain a silicon atom-bonded alkenyl group include dimethylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane and methylvinylsiloxane with both molecular chain terminals blocked with trimethylsiloxy groups, and methyl(3,3,3-trifluoropropyl)polysiloxane with both molecular chain terminals blocked with dimethylvinylsiloxy groups.

In those cases where the composition of the present invention is a condensation reaction curing composition, the component (A) typically comprises an organopolysiloxane having at least two silanol groups or silicon atom-bonded hydrolyzable groups within each molecule.

Examples of the silicon atom-bonded hydrolyzable groups within this organopolysiloxane include alkoxy groups such as a methoxy group, ethoxy group, or propoxy group; alkoxyalkoxy groups such as a methoxyethoxy group, ethoxyethoxy group, or methoxypropoxy group; acyloxy groups such as an acetoxy group, octanoyloxy group, or benzoyloxy group; alkenoxy groups such as a vinyloxy group, isopropenyloxy group, or 1-ethyl-2-methylvinyloxy group; ketoxime groups such as a dimethyl ketoxime group, methyl ethyl ketoxime group, or diethyl ketoxime group; amino groups such as a dimethylamino group, diethylamino group, butylamino group, or cyclohexylamino group; aminoxy groups such as a dimethylaminoxy group or diethylaminoxy group; and amide groups such as an N-methylacetamide group, N-ethylacetamide group, or N-methylbenzamide group. Of these, an alkoxy group is preferred.

Examples of these types of organopolysiloxanes include dimethylpolysiloxane with both molecular chain terminals blocked with silanol groups, dimethylpolysiloxane with both molecular chain terminals blocked with trimethoxysiloxy groups, dimethylpolysiloxane with both molecular chain terminals blocked with methyldimethoxysiloxy groups, and dimethylpolysiloxane with both molecular chain terminals blocked with triethoxysiloxy groups.

In those cases where the composition of the present invention is a free radical reaction curing composition, there are no particular restrictions on the organopolysiloxane of the component (A), although organopolysiloxanes having at least one silicon atom-bonded alkenyl group within each molecule are preferred. Examples of the silicon atom-bonded alkenyl group include a vinyl group and an allyl group, although a vinyl group is preferred.

Examples of these types of organopolysiloxanes that contain a silicon atom-bonded alkenyl group include dimethylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane and methylvinylsiloxane with both molecular chain terminals blocked with trimethylsiloxy groups, and methyl(3,3,3-trifluoropropyl)polysiloxane with both molecular chain terminals blocked with dimethylvinylsiloxy groups.

[Component (B)]

The component (B) is an organosilicon compound represented by a general formula (2) shown below:

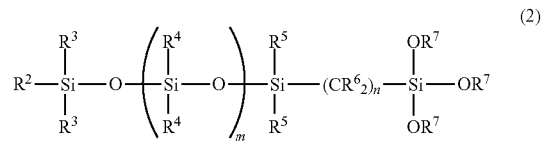

(2)

(wherein, $R^2$ represents an unsubstituted or substituted alkyl group, alkenyl group or aryl group, each $R^3$ represents, independently, an unsubstituted or substituted alkyl group, alkenyl group or aryl group, $R^4$ and $R^5$ each represent identical or different, unsubstituted or substituted monovalent hydrocarbon groups, each $R^6$ represents, independently, a hydrogen atom, or an unsubstituted or substituted monovalent hydrocarbon group, each $R^7$ represents, independently, an unsubstituted or substituted alkyl group, alkoxyalkyl group, alkenyl group or acyl group, m represents an integer from 0 to 4, and n represents an integer from 2 to 20). The component (B) may use either a single compound, or a combination of two or more different compounds.

The component (B) performs the roles of suppressing increases in the viscosity or plasticity of the composition even when the composition is filled with a large quantity of a heat-conductive filler, and maintaining the flexibility of the cured product, and as such, represents a special feature of the heat-conductive silicone composition of the present invention and the cured product thereof. In other words, the component (B) functions as a so-called wetter for the heat-conductive filler. Because this wetter of the component (B) has a reasonably large molecular weight, it exhibits a much lower volatility than the alkoxysilanes typically used as the wetter component within conventional heat-conductive fillers, and consequently is capable of suppressing increases in the viscosity of the composition even when exposed to high temperatures over an extended period. Moreover, this wetter of the component (B) also suppresses increases in the hardness of the cured product, enabling flexibility of the cured product to be more readily maintained. Furthermore, because this wetter does not freeze, even at low temperatures such as −30° C., variation in the composition at low temperatures can be prevented, and the flexibility of the cured product can be maintained. Moreover, compared with an identical quantity of an alkoxy group-containing organopolysiloxane of the general formula (2) in which m is 5 or greater, as disclosed in the above patent reference 9, the wetter of the present invention exhibits a superior wetting performance. In other words, a composition of the present invention containing the component (B) suffers a minimal increase in viscosity or plasticity even when the thermal conductivity is increased significantly, and enables flexibility of the cured product to be maintained.

In the above general formula (2), $R^2$ represents an unsubstituted or substituted alkyl group, alkenyl group or aryl group that preferably contains from 6 to 30 carbon atoms, and even more preferably from 8 to 20, and most preferably from 10 to 16, carbon atoms. If the number of carbon atoms of $R^2$ is within this range, then the effect of the resulting organosilicon compound in improving the wetting of the filler relative to the silicone manifests readily, and handling is favorable because the organosilicon compound is resistant to solidification even at low temperatures (for example, −40° C. to −20° C.). Specific examples of $R^2$ include alkyl groups such as a hexyl group, heptyl group, octyl group, nonyl group, decyl group, dodecyl group, tetradecyl group, hexadecyl group, octadecyl group or eicosyl group; alkenyl groups such as a hexenyl group, heptenyl group, octenyl group, nonenyl group, decenyl group, dodecenyl group or tetradecenyl group; aryl groups such as a phenyl group, tolyl group, xylyl group or naphthyl group; and groups in which a portion of, or all of, the hydrogen atoms bonded to carbon atoms in the above hydrocarbon groups have been substituted with halogen atoms or the like such as fluorine, bromine or chlorine atoms, such as a 2-(nonafluorobutyl)ethyl group, 2-(heptadecafluorooctyl) ethyl group or p-chlorophenyl group.

In the above general formula (2), each $R^3$ represents, independently, an unsubstituted or substituted group, which is preferably an alkyl group or alkenyl group of 1 to 8 carbon atoms or aryl group of 6 to 8 carbon atoms, is even more preferably an alkyl group or alkenyl group of 1 to 5 carbon atoms, and is most preferably an alkyl group or alkenyl group of 1 to 3 carbon atoms. Specific examples of $R^3$ include alkyl groups such as a methyl group, ethyl group, propyl group, isopropyl group, butyl group, t-butyl group, pentyl group, hexyl group or octyl group; alkenyl groups such as a vinyl group, allyl group or butenyl group; aryl groups such as a phenyl group, tolyl group or xylyl group; and groups in which a portion of, or all of, the hydrogen atoms bonded to carbon atoms in the above hydrocarbon groups have been substituted with halogen atoms or the like such as fluorine, bromine or chlorine atoms, such as a chloromethyl group, bromoethyl group, 3,3,3-trifluoropropyl group, 2-(nonafluorobutyl)ethyl group or p-chlorophenyl group. Of these possibilities, from the viewpoints of ease of synthesis of the organosilicon compound of the component (B) and economic viability, a methyl group or ethyl group is particularly preferred.

In the above general formula (2), $R^4$ and $R^5$ each represent identical or different, unsubstituted or substituted, saturated or unsaturated, monovalent hydrocarbon groups that preferably contain from 1 to 8 carbon atoms, and even more preferably from 1 to 5, and most preferably from 1 to 3, carbon atoms. Specific examples of $R^4$ and $R^5$ include alkyl groups such as a methyl group, ethyl group, propyl group, isopropyl group, butyl group, t-butyl group, pentyl group, hexyl group or octyl group; cycloalkyl groups such as a cyclopentyl group or cyclohexyl group; alkenyl groups such as a vinyl group, allyl group or butenyl group; aryl groups such as a phenyl group, tolyl group or xylyl group; aralkyl groups such as a benzyl group or 2-phenylethyl group; and groups in which a portion of, or all of, the hydrogen atoms bonded to carbon atoms in the above hydrocarbon groups have been substituted with halogen atoms or the like such as fluorine, bromine or chlorine atoms, including halogenated monovalent hydrocarbon groups such as a chloromethyl group, bromoethyl group, 3,3,3-trifluoropropyl group, 2-(nonafluorobutyl)ethyl group or p-chlorophenyl group. Of these possibilities, from the viewpoints of ease of synthesis of the organosilicon compound of the component (B) and economic viability, a methyl group or ethyl group is particularly preferred.

In the above general formula (2), each $R^6$ group represents, independently, a hydrogen atom, or an unsubstituted or substituted monovalent hydrocarbon group that preferably contains from 1 to 5 carbon atoms, and even more preferably from 1 to 3, and most preferably from 1 to 2, carbon atoms. In those cases where $R^6$ is a monovalent hydrocarbon group, specific examples of suitable groups include alkyl groups such as a methyl group, ethyl group, propyl group, isopropyl group, butyl group, t-butyl group or pentyl group; cycloalkyl groups such as a cyclopentyl group; alkenyl groups such as a vinyl group, allyl group or butenyl group; and groups in which a portion of, or all of, the hydrogen atoms bonded to carbon atoms in the above hydrocarbon groups have been substituted with halogen atoms or the like such as fluorine, bromine or chlorine atoms, such as a chloromethyl group, bromoethyl group or 3,3,3-trifluoropropyl group. Of these possibilities, from the viewpoints of ease of synthesis of the organosilicon compound of the component (B) and economic viability, $R^6$ is most preferably a hydrogen atom.

In the above general formula (2), each $R^7$ represents, independently, an unsubstituted or substituted alkyl group, alkoxyalkyl group, alkenyl group or acyl group, that preferably contains from 1 to 6, even more preferably from 1 to 4, and most preferably from 1 to 3, carbon atoms. In those cases where $R^7$ is an alkyl group, specific examples of suitable groups include alkyl groups such as a methyl group, ethyl group, propyl group, isopropyl group, butyl group, t-butyl group, pentyl group or hexyl group; and groups in which a portion of, or all of, the hydrogen atoms bonded to carbon atoms within the above alkyl groups have been substituted with halogen atoms or the like such as fluorine, bromine or chlorine atoms, such as a chloromethyl group, bromoethyl group, 3,3,3-trifluoropropyl group or 2-(nonafluorobutyl) ethyl group. Furthermore, in those cases where $R^7$ is an alkoxyalkyl group, specific examples of suitable groups include alkoxyalkyl groups such as a methoxyethyl group, methoxypropyl group, ethoxyethyl group or butoxyethyl group; and groups in which a portion of, or all of, the hydrogen atoms bonded to carbon atoms within these alkoxyalkyl groups have been substituted with halogen atoms or the like such as fluorine, bromine or chlorine atoms. In those cases where $R^7$ is an alkenyl group, specific examples of suitable groups include alkenyl groups such as a vinyl group, allyl group or butenyl group; and groups in which a portion of, or all of, the hydrogen atoms bonded to carbon atoms within these alkenyl groups have been substituted with halogen atoms or the like such as fluorine, bromine or chlorine atoms. Moreover, in those cases where $R^7$ is an acyl group, specific examples of suitable groups include acyl groups such as an acetyl group, propionyl group, acryloyl group or methacryloyl group; and groups in which a portion of, or all of, the hydrogen atoms bonded to carbon atoms within these acyl groups have been substituted with halogen atoms or the like such as fluorine, bromine or chlorine atoms. Of these possibilities, from the viewpoints of ease of synthesis of the organosilicon compound of the component (B) and economic viability, a methyl group or ethyl group is particularly preferred.

In the above general formula (2), m is typically an integer from 0 to 4, and is preferably from 0 to 3, and even more preferably from 0 to 2. From the viewpoints of ease of synthesis of the organosilicon compound of the component (B) and economic viability, m is most preferably an integer from 0 to 1. Furthermore, in the above general formula (2), n is typically an integer from 2 to 20, although from the viewpoints of ease of synthesis of the organosilicon compound of the component (B) and economic viability, n is preferably within a range from 2 to 10, and is most preferably 2.

Specific examples of the organosilicon compound represented by the general formula (2) include the compounds shown below, although the present invention is not restricted to the compounds shown below.

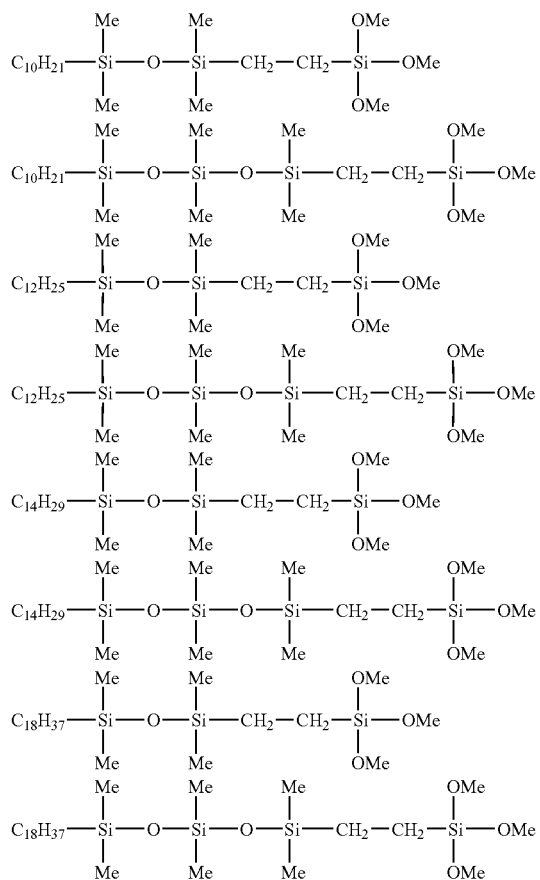

The quantity added of the component (B) is typically within a range from 0.1 to 50 parts by volume, and preferably from 1 to 20 parts by volume, per 100 parts by volume of the component (A). If the quantity of the component (B) is less than 0.1 parts by volume, then the effects of the component (B) are less likely to manifest satisfactorily. In contrast, if the quantity exceeds 50 parts by volume, then the resulting composition may not cure satisfactorily.

An organosilicon compound of the general formula (2) can be produced, for example, using the methods described below.

In a first method, the organosilicon compound is produced using a method that includes a step represented by the reaction formula (A) shown below.

Reaction Formula (A):

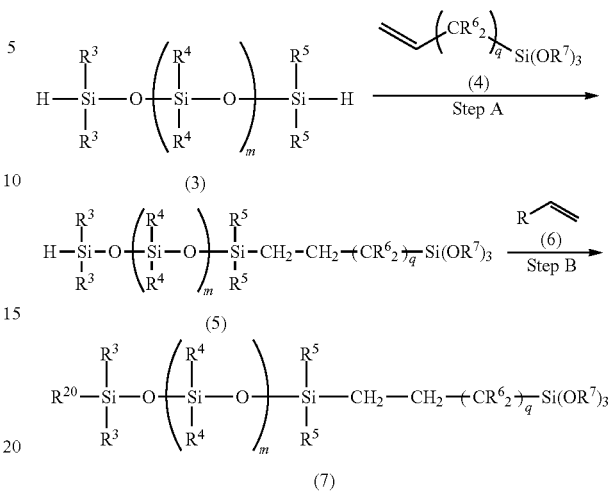

(wherein, $R^3$ to $R^7$, and m are as defined above; R represents an unsubstituted or substituted alkyl group or alkenyl group that preferably contains from 4 to 28 carbon atoms, and even more preferably from 6 to 18, and most preferably from 8 to 14, carbon atoms; $R^{20}$ represents an unsubstituted or substituted alkyl group or alkenyl group represented by R—$CH_2$—$CH_2$— that preferably contains from 6 to 30 carbon atoms, and even more preferably from 8 to 20, and most preferably from 10 to 16, carbon atoms; and q represents either 0 or 1)

<Step A>

By reacting an organohydrogensiloxane (3) with a vinylsilane (4) in the presence of a hydrosilylation catalyst, a diorganohydrogensiloxy-mono-terminated organosiloxane (5) is synthesized.

This reaction may be conducted without a solvent. Alternatively, the reaction may be conducted in the presence of a solvent such as toluene. The reaction temperature is typically within a range from 70 to 100° C., and is preferably from 70 to 90° C. The reaction time is typically from 1 to 3 hours. In this reaction, the quantity added of the vinylsilane (4) is preferably within a range from 0.5 to 1.0 mols, and even more preferably from 0.5 to 0.6 mols, per 1 mol of the organohydrogensiloxane (3).

<Step B>

By reacting the diorganohydrogensiloxy-mono-terminated organosiloxane (5) with an alkene (6) in the presence of a hydrosilylation catalyst, an organosilicon compound (7) is obtained.

The reaction temperature is typically within a range from 70 to 100° C., and is preferably from 70 to 90° C. The reaction time is typically from 1 to 3 hours. In this reaction, the quantity added of the alkene (6) is preferably within a range from 1.0 to 2.0 mols, and even more preferably from 1.0 to 1.5 mols, per 1 mol of the diorganohydrogensiloxy-mono-terminated organosiloxane (5).

Specific examples of the group R include alkyl groups such as a butyl group, pentyl group, hexyl group, heptyl group, octyl group, nonyl group, decyl group, dodecyl group, tetradecyl group, hexadecyl group or octadecyl group; alkenyl groups such as a butenyl group, pentenyl group, hexenyl group, heptenyl group, octenyl group, nonenyl group, decenyl group, dodecenyl group or tetradecenyl group; aryl groups such as a phenyl group, tolyl group, xylyl group or naphthyl group; and groups in which a portion of, or all of, the hydrogen atoms bonded to carbon atoms within these hydrocarbon groups have been substituted with halogen atoms or the like such as fluorine, bromine or chlorine atoms, such as a 2-(nonafluorobutyl)ethyl group, 2-(heptadecafluorooctyl) ethyl group or p-chlorophenyl group.

In a second method, the organosilicon compound is produced using a method that includes a step represented by the reaction formula (B) shown below.

Reaction Formula (B):

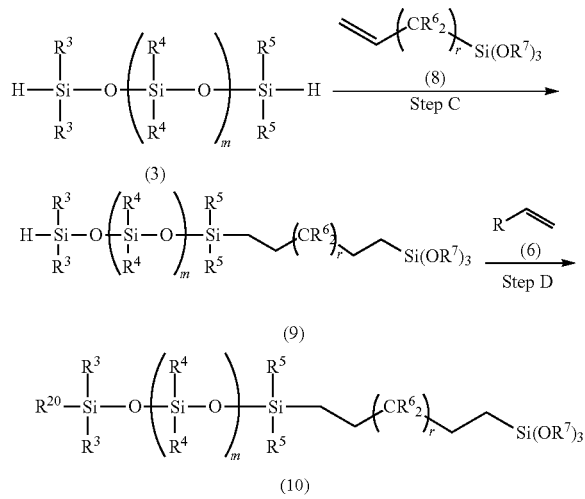

(wherein, $R^3$ to $R^7$, $R^{20}$, R and m are as defined above; and r represents an integer from 0 to 16)

<Step C>

By reacting an organohydrogensiloxane (3) with an alkenyltriorganooxysilane (8) in the presence of a hydrosilylation catalyst, a diorganohydrogensiloxy-mono-terminated organosiloxane (9) is synthesized.

This reaction may be conducted without a solvent. Alternatively, the reaction may be conducted in the presence of a solvent such as toluene. The reaction temperature is typically within a range from 70 to 100° C., and is preferably from 70 to 90° C. The reaction time is typically from 1 to 3 hours. In this reaction, the quantity added of the alkenyltriorganooxysilane (8) is preferably within a range from 0.5 to 1.0 mols, and even more preferably from 0.5 to 0.6 mols, per 1 mol of the organohydrogensiloxane (3).

<Step D>

By reacting the diorganohydrogensiloxy-mono-terminated organosiloxane (9) with an alkene (6) in the presence of a hydrosilylation catalyst, an organosilicon compound (10) is obtained.

The reaction temperature is typically within a range from 70 to 100° C., and is preferably from 70 to 90° C. The reaction time is typically from 1 to 3 hours. In this reaction, the quantity added of the alkene (6) is preferably within a range from 1.0 to 2.0 mols, and even more preferably from 1.0 to 1.5 mols, per 1 mol of the diorganohydrogensiloxy-mono-terminated organosiloxane (9).

Examples of methods of producing the raw material alkenyltriorganooxysilane (8) include methods that include a step represented by the reaction formula (C) shown below.

Reaction Formula (C):

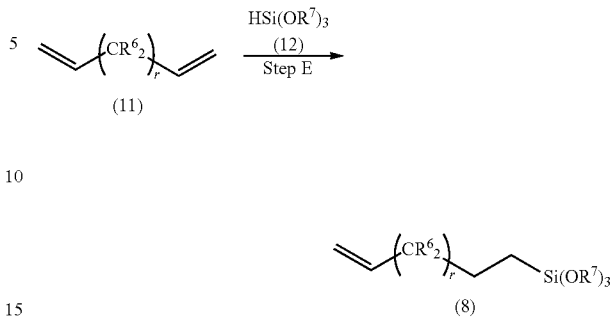

(wherein, $R^6$, $R^7$, and r are as described above)

<Step E>

By reacting a diene (11) and a triorganooxysilane (12) in the presence of a hydrosilylation catalyst, an alkenyltriorganooxysilane (8) is synthesized. This reaction may be conducted without a solvent. Alternatively, the reaction may be conducted in the presence of a solvent such as toluene. The reaction temperature is typically within a range from 70 to 100° C., and is preferably from 70 to 90° C. The reaction time is typically from 1 to 3 hours. In this reaction, the quantity added of the triorganooxysilane (12) is preferably within a range from 0.5 to 1.0 mols, and even more preferably from 0.5 to 0.6 mols, per 1 mol of the diene (11).

<Hydrosilylation Catalyst>

The hydrosilylation catalyst used in each of the steps described above is a catalyst for accelerating the addition reaction between the aliphatic unsaturated group (alkenyl group or diene group or the like) within one of the raw material compounds, and the silicon atom-bonded hydrogen atom (namely, SiH group) within the other raw material compound. Examples of the hydrosilylation catalyst include platinum group metal-based catalysts such as simple platinum group metals, and compounds thereof. Conventional platinum group metal-based catalysts can be used, and specific examples include fine particles of platinum metal adsorbed to a carrier such as silica, alumina or silica gel, platinic chloride, chloroplatinic acid, an alcohol solution of chloroplatinic acid hexahydrate, as well as palladium catalysts and rhodium catalysts, although of these, compounds that contain platinum as the platinum group metal are preferred. The hydrosilylation catalyst may use either a single material, or a combination of two or more different materials.

The quantity added of the hydrosilylation catalyst need only be sufficient to enable effective acceleration of the aforementioned addition reactions, and a typical quantity, calculated as a mass of the platinum group metal relative to the combined mass of the raw material compounds, is within a range from 1 ppm (by mass, this also applies below) to 1% by mass, and a quantity from 10 to 500 ppm is preferred. If the quantity is within this range, then the addition reactions can be accelerated satisfactorily, and the rate of the addition reactions can be easily increased by increasing the quantity of the hydrosilylation catalyst, which is desirable from an economic viewpoint.

[Component (C)]

The component (C) imparts thermal conductivity to the heat-conductive silicone composition and the cured product of the present invention, and there are no particular restrictions on the nature of the component (C). The component (C) may use either a single compound, or a combination of two or more different compounds. Specific examples of the component (C) include aluminum, silver, copper, nickel, zinc oxide, aluminum oxide, silicon oxide, magnesium oxide, aluminum nitride, boron nitride, silicon nitride, silicon carbide, diamond, graphite, carbon nanotubes, metallic silicon, carbon fiber, fullerene, or combinations of two or more of these materials.

The average particle size of the heat-conductive filler of the component (C) is preferably within a range from 0.1 to 50 μm, and is even more preferably from 1 to 35 μm. If the average particle size is within this range, then the problem of the specific surface area of the component (C) becoming overly large and impeding high-quantity filling can be more readily prevented, the viscosity of the composition of the present invention can be kept at a low level, and oil separation within the composition can be prevented from occurring. Moreover, the surface of the cured product is less likely to develop large surface irregularities, and the contact thermal resistance is more readily maintained at a low level. In the present invention, a heat-conductive filler with a large average particle size (specifically, an average particle size within a range from 5 to 40 μm) and a heat-conductive filler with a small average particle size (specifically, an average particle size within a range from 0.1 to 5 μm) are preferably combined in a ratio determined in accordance with a closest packing theoretical distribution curve, as this improves the packing efficiency, and enables a lower viscosity and a higher thermal conductivity to be achieved. Furthermore, in the present invention, the average particle size can be determined as a volume-based cumulative average particle size, using a laser diffraction method.

There are no particular restrictions on the shape of the particles of the component (C), and spherical, rod-shaped, needle-like, disc-shaped, scale-like, and irregularly shaped particles are all suitable.

The quantity of the component (C) is typically within a range from 100 to 2,500 parts by volume, and preferably from 150 to 1,500 parts by volume, per 100 parts by volume of the component (A). If this quantity is less than 100 parts by volume, then the thermal conductivity of the resulting composition and cured product tends to decrease. In contrast, if the total quantity exceeds 2,500 parts by volume, then the viscosity of the resulting composition tends to become overly high, making handling difficult, and the cured product tends to be prone to brittleness.

[Component (D)]

There are no particular restrictions on the curing agent of the component (D), and any of the conventional curing agents used for organopolysiloxane cross-linking reactions, that is for silicone curing, can be used. The component (D) may use either a single compound, or a combination of two or more different compounds. In a preferred embodiment of the present invention, the curing agent of the component (D) is one or more curing agents selected from the group consisting of hydrosilylation reaction curing agents, condensation reaction curing agents, and free radical reaction curing agents.

<Hydrosilylation Reaction Curing Agent>

In those cases where the composition of the present invention is a hydrosilylation reaction curing composition, the curing agent of the component (D) comprises an organohydrogenpolysiloxane containing an average of two or more silicon atom-bonded hydrogen atoms within each molecule, and a platinum group metal-based catalyst. Both the organohydrogenpolysiloxane and the platinum group metal-based catalyst may use either a single material, or a combination of two or more different materials.

Examples of the silicon atom-bonded groups other than hydrogen atoms within the organohydrogenpolysiloxane include alkyl groups such as a methyl group, ethyl group, propyl group, butyl group, pentyl group, or hexyl group; cycloalkyl groups such as a cyclopentyl group or cyclohexyl group; aryl groups such as a phenyl group, tolyl group, or xylyl group; aralkyl groups such as a benzyl group or phenethyl group; and halogenated hydrocarbon groups such as a 3,3,3-trifluoropropyl group or 3-chloropropyl group. Of these, alkyl groups and aryl groups are preferred, and a methyl group or phenyl group is particularly desirable.

There are no particular restrictions on the viscosity of this organohydrogenpolysiloxane at 25° C., although a value within a range from 1 to 10,000 mPa·s is preferred, and a value from 1 to 1,000 mPa·s is even more desirable. Provided the viscosity falls within this range, the handling and workability of the composition of the present invention are more readily maintained, and the favorable physical properties of the cured product of the composition are also more readily maintained.

There are no particular restrictions on the molecular structure of this organohydrogenpolysiloxane, and suitable structures include straight-chain structures, branched-chain structures, straight-chain structures with partial branching, cyclic structures and dendrimer structures. The organohydrogenpolysiloxane may be a single polymer with one of the above molecular structures, a copolymer with one of the above molecular structures, or a mixture of such polymers. The silicon atom-bonded hydrogen atoms described above may exist solely at the molecular chain terminals, solely at non-terminal positions within the molecular chain, or at both these positions.

Examples of this organohydrogenpolysiloxane include dimethylpolysiloxane with both molecular chain terminals blocked with dimethylhydrogensiloxy groups, copolymers of dimethylsiloxane and methylhydrogensiloxane with both molecular chain terminals blocked with trimethylsiloxy groups, and copolymers of dimethylsiloxane and methylhydrogensiloxane with both molecular chain terminals blocked with dimethylhydrogensiloxy groups.

There are no particular restrictions on the quantity of this organohydrogenpolysiloxane within the composition of the present invention, provided the quantity is sufficient to enable curing of the composition. Specifically, the quantity is preferably sufficient to provide from 0.1 to 5 mols, and even more preferably from 0.3 to 3.5 mols of silicon atom-bonded hydrogen atoms within the component (D) for each 1 mol of silicon atom-bonded alkenyl groups within the organopolysiloxane of the component (A). Provided this quantity satisfies the above range, the composition of the present invention can be cured favorably, while the resulting cured product can be prevented from becoming overly hard.

The platinum group metal-based catalyst is a catalyst for accelerating the curing of the composition of the present invention, and conventional catalysts can be used without any particular restrictions. The platinum group metal-based catalyst may use either a single material, or a combination of two or more different materials. Examples of suitable platinum group metal-based catalysts include platinum group metals such as platinum (including platinum black), rhodium and palladium, as well as platinum compounds such as chloroplatinic acid and alcohol solutions thereof.

The quantity of the platinum group metal-based catalyst need only be sufficient to be effective as a hydrosilylation reaction catalyst. Specifically, the quantity of the catalyst, calculated as a mass of the platinum group metal within the component (D) relative to the mass of the component (A), is preferably within a range from 0.1 to 1,000 ppm, and even more preferably from 1 to 500 ppm. Provided the quantity satisfies this range, the composition of the present invention can be cured favorably, and the curing rate of the composition can be increased markedly by increasing the quantity of the catalyst.

Moreover, in those cases where the composition of the present invention is a hydrosilylation reaction curing composition, compounds including vinyl group-containing organopolysiloxanes such as methylvinylcyclotetrasiloxane; triallyl isocyanurate; and acetylene alcohols or siloxane-modified products thereof (compounds in which the hydroxyl group of the acetylene alcohol has been converted to a Si—O—C linkage, for example, through silylation with an alkoxysiloxane) may also be added to the composition in order to adjust the curing rate or the storage stability of the composition.

<Condensation Reaction Curing Agent>

In those cases where the composition of the present invention is a condensation reaction curing composition, the curing agent of the component (D) comprises a silane containing at least two hydrolyzable groups bonded to silicon atoms within each molecule and/or a partial hydrolysis-condensation product thereof. This silane and/or partial hydrolysis-condensation product thereof may use either a single compound, or a combination of two or more different compounds. Examples of this silane and/or partial hydrolysis-condensation product thereof include silanes represented by a general formula (13) shown below, and/or partial hydrolysis-condensation products thereof.

$$R^8{}_b SiX_{4-b} \qquad (13)$$

(wherein, $R^8$ represents identical or different, unsubstituted or substituted monovalent hydrocarbon groups of 1 to 8 carbon atoms, X represents identical or different hydrolyzable groups, and b represents an integer from 0 to 2)

Examples of the above hydrolyzable groups (X in the general formula (13)), include the same groups as those exemplified above as the hydrolyzable groups other than a hydroxyl group within the organopolysiloxane of the component (A), and of these, alkoxy groups, ketoxime groups or an isopropenyloxy group are preferred.

There are no particular restrictions on this silane and/or partial hydrolysis-condensation product thereof, other than the requirement to contain at least two hydrolyzable groups within each molecule, although compounds containing three or more hydrolyzable groups are preferred. Groups other than the hydrolyzable groups may also be bonded to silicon atoms within the molecule, and the molecular structure of the compound may have either a silane structure or a siloxane structure. Particularly in those cases where the molecular structure is a siloxane structure, the structure may be any one of a straight-chain structure, a branched-chain structure and a cyclic structure.

The above groups other than the hydrolyzable groups (the groups $R^8$ in the above general formula (13)) are identical or different, unsubstituted or substituted monovalent hydrocarbon groups of 1 to 8 carbon atoms, and preferably of 1 to 6 carbon atoms. Specific examples of suitable groups include alkyl groups such as a methyl group, ethyl group, propyl group, butyl group, pentyl group and hexyl group; cycloalkyl groups such as a cyclopentyl group and cyclohexyl group; aryl groups such as a phenyl group and tolyl group; aralkyl groups such as a benzyl group and 2-phenylethyl group; alkenyl groups such as a vinyl group, allyl group, butenyl group, pentenyl group and hexenyl group; and halogenated alkyl groups such as a 3,3,3-trifluoropropyl group and 3-chloropropyl group. Of these, a methyl group, ethyl group, phenyl group or vinyl group is preferred.

Specific examples of the silane and/or partial hydrolysis-condensation product thereof include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenyloxysilane, methyltriacetoxysilane, vinyltriacetoxysilane, methyltri(methyl ethyl ketoxime)silane, vinyltri(methyl ethyl ketoxime)silane, phenyltri(methyl ethyl ketoxime)silane, propyltri(methyl ethyl ketoxime)silane, tetra(methyl ethyl ketoxime)silane, 3,3,3-trifluoropropyltri(methyl ethyl ketoxime)silane, 3-chloropropyltri(methyl ethyl ketoxime)silane, methyltri(dimethyl ketoxime)silane, methyltri(diethyl ketoxime)silane, methyltri(methyl isopropyl ketoxime)silane, tri(cyclohexanoxime)silane, and partial hydrolysis-condensation products of the above compounds. These compounds may be used either alone, or in combinations of two or more different compounds.

The quantity of this silane and/or partial hydrolysis-condensation product thereof is preferably within a range from 0.5 to 20 parts by mass, and even more preferably from 1 to 10 parts by mass, per 100 parts by mass of the above component (A). Provided this quantity satisfies the above range, adequate cross-linking can be formed within the cured product of the present invention, while the cured product can be prevented from becoming overly hard. A quantity within the above range is also economically more viable.

A condensation reaction curing catalyst may be added to further accelerate the curing that proceeds via the condensation reaction. This condensation reaction curing catalyst may use either a single compound, or a combination of two or more different compounds. Any of the various conventional catalysts used in room temperature curable compositions that undergo curing via a condensation reaction can be used as the condensation reaction curing catalyst. Specific examples of such catalysts include metal salts of organic carboxylic acids such as lead 2-ethyloctoate, dibutyltin dioctoate, dibutyltin diacetate, dibutyltin dilaurate, dibutyltin 2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butyrate, titanium naphthenate, zinc naphthenate, cobalt naphthenate and zinc stearate; organotitanate esters such as tetrabutyl titanate, tetra(2-ethylhexyl) titanate, triethanolamine titanate and tetra(isopropenyloxy) titanate; organotitanium compounds such as organosiloxy titanium, β-carbonyl titanium, diisopropoxytitanium bis(ethylacetoacetate), and titanium tetra(acetylacetonate); alkoxy aluminum compounds; aminoalkyl group-substituted alkoxysilanes such as 3-aminopropyltriethoxysilane and N-(trimethoxysilylpropyl)ethylenediamine; amine compounds and the salts thereof such as hexylamine and dodecylamine phosphate; quaternary ammonium salts such as benzyltriethylammonium acetate; alkali metal salts of lower aliphatic acids such as potassium acetate, sodium acetate and lithium oxalate; dialkylhydroxylamines such as dimethylhydroxylamine and diethylhydroxylamine; as well as guanidine compounds and guanidyl group-containing silanes and siloxanes. These compounds may be used either alone, or in combinations of two or more different compounds.

In those cases where a condensation reaction curing catalyst is used, there are no particular restrictions on the quantity of the catalyst, and an effective catalytic quantity is adequate. Specifically, the quantity of the catalyst is preferably within a range from 0.01 to 20 parts by mass, and even more preferably from 0.1 to 10 parts by mass, per 100 parts by mass of the component (A). Provided the quantity satisfies the above range, the storage stability of the composition of the present invention can be maintained favorably, while the composition can be more readily cured.

<Free Radical Reaction Curing Agent>

In those cases where the composition of the present invention is a free radical reaction curing composition, the curing agent of the component (D) comprises an organic peroxide. There are no particular restrictions on this organic peroxide, although specific examples of suitable compounds include di-t-butyl peroxide, 2,5-dimethyl-2,5-di(t-butylperoxy)hexane, and dicumyl peroxide.

There are no particular restrictions on the quantity of this organic peroxide, provided the composition of the present invention undergoes satisfactory curing, and the quantity can be set in a similar manner to typical silicone rubber compositions. Specifically, the quantity of the organic peroxide is preferably within a range from 0.1 to 10 parts by mass, and even more preferably from 0.2 to 5 parts by mass, per 100 parts by mass of the component (A).

[Other Additives]

If required, predetermined quantities of typically used additives and fillers may also be added as optional components to the heat-conductive silicone composition and the cured product of the present invention, provided such addition does not impair the effects of the present invention. Examples of these additives include reinforcing silica materials such as fumed silica and precipitated silica; colorants such as carbon black, titanium oxide, iron oxide, and cerium oxide; flame retardancy-imparting agents such as metal hydroxides; adhesion improvers including so-called carbon functional silanes containing an amino group, epoxy group or thiol group or the like (such as γ-glycidoxypropyltrimethoxysilane and aminopropyltriethoxysilane); heat resistance improvers; thixotropic improvers; and antibacterial and moldproofing agents.

[Composition Production]

The heat-conductive silicone composition of the present invention can be produced, for example, using the method described below. First, the organopolysiloxane of the component (A), the heat-conductive filler of the component (C), and the organosilicon compound of the component (B) are mixed together using a mixing device such as a planetary mixer, kneader or Shinagawa mixer, thus yielding a base composition. This mixing may be conducted at room temperature, or if required, the mixing may be conducted under heating at a temperature of at least 80° C., and preferably at a temperature within a range from 120 to 200° C. In the above process, rather than adding the organosilicon compound of the component (B) and the heat-conductive filler of the component (C) separately to the mixing device, a component (C) that has been pre-treated with the component (B) may be added to the mixing device. In other words, the organopolysiloxane of the component (A) may be mixed with the heat-conductive filler of the component (C) that has undergone pre-treatment with the organosilicon compound of the component (B). In such cases, the component (B) is in a state of having treated the surface of the component (C) when mixed with the component (A), although the component (B) may also include material that has not contributed to the surface treatment of the component (C), and is simply mixed with the component (A) together with the component (C). Subsequently, the generated base composition is cooled to a temperature of not more than 40° C., and preferably to room temperature, and the curing agent of the component (D) is then added, thereby enabling efficient production of the heat-conductive silicone composition of the present invention.

[Cured Product Production]

In the present invention, a heat-conductive silicone cured product can be obtained by curing the heat-conductive silicone composition produced in the manner described above. If required, the cured product can be produced as discrete molded items having predetermined shapes, or the composition of the present invention can be applied within the required regions and then cured to form the cured product. There are no particular restrictions on the curing conditions, and the composition of the present invention can either be cured by standing at room temperature, or cured by heating at a temperature within a range from 50 to 200° C.

In those cases where the cured product is produced as a molded item having a predetermined shape such as a sheet or a tube, examples of suitable molding methods include those outlined below, and an appropriate method can be selected depending on whether the composition of the present invention is a liquid composition or a millable composition.

<Die Molding>

The uncured composition is poured into a molding die, and once the die has been closed, pressure and heat are applied using a heat press, thereby curing the composition.

<Injection Molding>

The uncured composition is injected from the nozzle of an injection molding device and used to fill the internal cavity of a heated mold. Following curing, the mold is opened and the molded item is removed.

<Coating Molding>

A film (such as a PET film) is supplied continuously to a coating apparatus, the uncured liquid composition is applied to the film with a predetermined thickness using a knife coater or the like, and the coated film is then passed through a heated oven to cure the liquid composition.

<Extrusion Molding>

By using an appropriate combination of an extruder die and nipple, the uncured millable composition is molded into any desired tube shape, and the molded tube is then passed through a heated oven to cure the composition.

<Calender Molding>

Using a calender roller, the uncured composition is spread out to a uniform thickness, and following transfer of the composition to a film, the film is passed through a heated oven to cure the composition.

[State and Hardness of Cured Product]

There are no particular restrictions on the state of the silicone cured product obtained in the manner described above, and suitable products include high-hardness through to low-hardness rubber-like products, gel-like products, and liquid products in which a cross-linking reaction has produced a liquid with a higher viscosity than the unreacted composition.

Furthermore, there are no particular restrictions on the viscosity or plasticity of the composition of the present invention, nor on the hardness of the cured product, although in those cases where the cured product of the composition of the present invention is used within an application that requires the thermal resistance within the contact portions to be reduced as much as possible, the Asker C hardness of the cured product is preferably within a range from 0 to 90, and even more preferably from 5 to 70. In this description, the "Asker C hardness" refers to the hardness measured in accordance with SRIS 0101 (a standard of the Society of Rubber Industry, Japan) and JIS S 6050, using an Asker C-type spring hardness tester, and a sample prepared by superimposing two sheets of thickness 6 mm. Provided the Asker C hardness is within the above range, the adhesiveness of the composition to heat-generating components, and the ability of the composition to track the shape and contours of such components can be maintained at favorable levels.

[Cured Product Reinforcement]

Regardless of the hardness level, the heat-conductive silicone cured product obtained from the composition of the present invention may be reinforced using a cloth or nonwoven fabric comprising glass cloth, polyester or nylon or the like, or a resin film comprising a polyimide, nylon or polyester, by either embedding the reinforcing material within the interior of the cured product or laminating the reinforcing material to the surface of the cured product. This type of reinforcement improves the strength of the silicone cured product and suppresses elongation, meaning the handling properties and workability of the cured product can be improved. This improvement in workability is particularly marked when the Asker C hardness of the cured product is less than 20.

[Thermal Conductivity]

There are no particular restrictions on the thermal conductivity of the heat-conductive silicone composition of the present invention and the cured product thereof, although the thermal conductivity is preferably at least 0.5 W/mK, and is even more preferably 1 W/mK or greater. Provided the thermal conductivity falls within this range, the heat conducting performance of the composition and cured product of the present invention are favorable, and efficient heat dissipation from the heat-generating sources can be achieved.

EXAMPLES

As follows is a description of specifics of the present invention using a series of synthesis examples, examples and comparative examples, although the present invention is not limited by the examples presented below.

Organosilicon compounds of the component (B) of the present invention were synthesized in the manner described below.

Synthesis Example 1

A 1 liter round-bottom separable flask with a 4-necked separable cover was fitted with a stirrer, a thermometer, a Graham condenser and a dropping funnel. The separable flask was then charged with 250.0 g (1.2 mols) of 1,1,3,3,5,5-hexamethyltrisiloxane, and the temperature was raised to 70° C. Once this temperature had been reached, 0.6 g of a 2% by mass 2-ethylhexanol solution of chloroplatinic acid was added, and the resulting mixture was stirred at 70° C. for 30 minutes. Subsequently, 88.9 g (0.6 mols) of trimethoxyvinylsilane was added dropwise over a one hour period with the temperature held at 70 to 80° C., thereby initiating a reaction. Following completion of this dropwise addition, the reaction was continued with the temperature held at 70 to 80° C. During the reaction, the unreacted trimethoxyvinylsilane was refluxed. The progress of the reaction was tracked by gas chromatography, and the point where the chromatographic peak for trimethoxyvinylsilane disappeared was deemed to represent the completion of the reaction, and heating was stopped at this point. Following completion of the reaction, the interior of the separable flask was evacuated to a state of reduced pressure, and the residual 1,1,3,3,5,5-hexamethyltrisiloxane was removed, yielding a product solution. This solution was purified by distillation, yielding 200.2 g (0.56 mols, yield: 56%) of the target product, 1-trimethoxysilylethyl-1,1,3,3,5,5-hexamethyltrisiloxane (14).

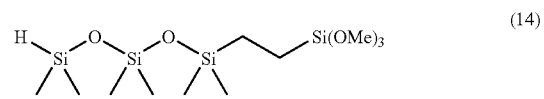

(14)

The above compound was identified by $^{29}$Si-NMR and $^{1}$H-NMR.

$^{29}$Si-NMR ($C_6D_6$): δ 8.33 to 7.82 ppm ($CH_2SiMe_2O$—), −7.23 to −7.51 ppm ($HSiMe_2O$—), −19.73 to −20.24 ppm (—$OSiMe_2O$—), −42.56 to −42.97 ppm ($Si(OMe)_3$);

$^{1}$H-NMR ($CDCl_3$): δ 4.70 to 4.66 ppm (m, 1H, HSi), 3.56 ppm (s, 9H, $Si(OCH_3)_3$), 1.09 to 0.56 ppm (m, 4H, $Si(CH_2)_2Si$), 0.17 to 0.02 ppm (m, 18H, $Si(CH_3)_2O$).

Synthesis Example 2

A 1 liter round-bottom separable flask with a 4-necked separable cover was fitted with a stirrer, a thermometer, a Graham condenser and a dropping funnel. The separable flask was then charged with 235.6 g (1.2 mols) of 1-tetradecene and the temperature was raised to 70° C. Once this temperature had been reached, 0.6 g of a 2% by mass 2-ethylhexanol solution of chloroplatinic acid was added, and the resulting mixture was stirred at 70° C. for 30 minutes. Subsequently, 356.71 g (1.0 mols) of the 1-trimethoxysilylethyl-1,1,3,3,5,5-hexamethyltrisiloxane obtained in the synthesis example 1 was added dropwise over a two hour period, thereby initiating a reaction. Following completion of this dropwise addition, the reaction was continued with the temperature held at 70 to 80° C. During the reaction, the unreacted 1-trimethoxysilylethyl-1,1,3,3,5,5-hexamethyltrisiloxane was refluxed. The progress of the reaction was tracked by gas chromatography, and the point where the chromatographic peak for 1-trimethoxysilylethyl-1,1,3,3,5,5-hexamethyltrisiloxane disappeared was deemed to represent the completion of the reaction, and heating was stopped at this point. Following completion of the reaction, the interior of the separable flask was evacuated to a state of reduced pressure, and the residual 1-tetradecene was removed, yielding an oily product. This oily product was purified with activated carbon, yielding 492.2 g (0.9 mols, yield: 89%) of the target product, 1-tetradecanyl-3-trimethoxysilylethyl-1,1,3,3,5,5-hexamethyltrisiloxane (15).

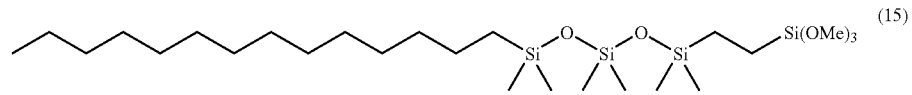

(15)

The above compound was identified by $^{29}$Si-NMR and $^{1}$H-NMR.

$^{29}$Si-NMR ($C_6D_6$): δ 7.95 to 6.93 ppm ($CH_2SiMe_2$, $OSiMe_2CH_2$), −21.39 to −21.89 ppm (—$OSiMe_2O$—), −42.53 to −42.90 ppm ($Si(OMe)_3$);

$^{1}$H-NMR ($CDCl_3$): δ3.56 ppm (s, 9H, $Si(OCH_3)_3$), 1.24 to 0.48 ppm (m, 33H, $Si(CH_2)_2Si$, $CH_2$, $CH_3$), 0.13 to 0.00 ppm (m, 18H, $Si(CH_3)_2O$).

Synthesis Example 3

A 1 liter round-bottom separable flask with a 4-necked separable cover was fitted with a stirrer, a thermometer, a Graham condenser and a dropping funnel. The separable flask was then charged with 537.3 g (4.0 mols) of 1,1,3,3-tetramethyldisiloxane, and the temperature was raised to 70° C. Once this temperature had been reached, 1.0 g of a 2% by mass 2-ethylhexanol solution of chloroplatinic acid was added, and the resulting mixture was stirred at 70° C. for 30 minutes. Subsequently, 296.5 g (2.0 mols) of trimethoxyvinylsilane was added dropwise over a two hour period with the temperature held at 70 to 80° C., thereby initiating a reaction. Following completion of this dropwise addition, the reaction was continued with the temperature held at 70 to 80° C. During the reaction, the unreacted trimethoxyvinylsilane was refluxed. The progress of the reaction was tracked by gas chromatography, and the point where the chromatographic peak for trimethoxyvinylsilane disappeared was deemed to represent the completion of the reaction, and heating was stopped at this point. Following completion of the reaction, the interior of the separable flask was evacuated to a state of reduced pressure, and the residual 1,1,3,3-tetramethyldisiloxane was removed, yielding a product solution. This solution was purified by distillation, yielding 339.1 g (1.2 mols, yield: 60%) of the target product, 1-trimethoxysilylethyl-1,1,3,3-tetramethyldisiloxane (16).

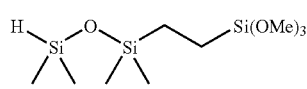
(16)

The above compound was identified by $^{29}$Si-NMR and $^{1}$H-NMR.

$^{29}$Si-NMR ($C_6D_6$): δ 10.19 to 9.59 ppm ($CH_2SiMe_2O$—), −6.88 to −7.50 ppm ($HSiMe_2O$—), −42.62 to −43.06 ppm ($Si(OMe)_3$);

$^{1}$H-NMR ($CDCl_3$): δ 4.66 to 4.59 ppm (m, 1H, HSi), 3.52 to 3.48 ppm (m, 9H, $Si(OCH_3)_3$), 1.04 to 0.48 ppm (m, 4H, $Si(CH_2)_2Si$), 0.12 to 0.01 ppm (m, 12H, $Si(CH_3)_2O$).

Synthesis Example 4

A 1 liter round-bottom separable flask with a 4-necked separable cover was fitted with a stirrer, a thermometer, a Graham condenser and a dropping funnel. The separable flask was then charged with 202.0 g (1.2 mols) of 1-dodecene, and the temperature was raised to 70° C. Once this temperature had been reached, 0.70 g of a 2% by mass 2-ethylhexanol solution of chloroplatinic acid was added, and the resulting mixture was stirred at 70° C. for 30 minutes. Subsequently, 282.6 g (1.0 mols) of the 1-trimethoxysilylethyl-1,1,3,3-tetramethyldisiloxane obtained in the synthesis example 3 was added dropwise over a two hour period, thereby initiating a reaction. Following completion of this dropwise addition, the reaction was continued with the temperature held at 70 to 80° C. During the reaction, the unreacted 1-trimethoxysilylethyl-1,1,3,3-tetramethyldisiloxane was refluxed. The progress of the reaction was tracked by gas chromatography, and the point where the chromatographic peak for 1-trimethoxysilylethyl-1,1,3,3-tetramethyldisiloxane disappeared was deemed to represent the completion of the reaction, and heating was stopped at this point. Following completion of the reaction, the interior of the separable flask was evacuated to a state of reduced pressure, and the residual 1-dodecene was removed, yielding an oily product. This oily product was purified with activated carbon, yielding 405.8 g (0.9 mols, yield: 90%) of the target product, 1-dodecanyl-3-trimethoxysilylethyl-1,1,3,3-tetramethyldisiloxane (17).

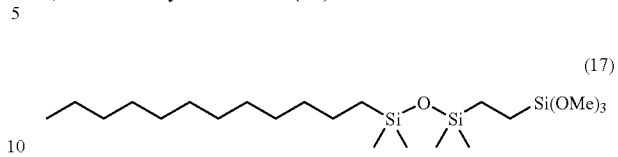
(17)

The above compound was identified by $^{29}$Si-NMR and $^{1}$H-NMR.

$^{29}$Si-NMR ($C_6D_6$): δ 7.85 to 6.82 ppm ($CH_2SiMe_2O$), −42.52 to −42.81 ppm ($Si(OMe)_3$);

$^{1}$H-NMR ($CDCl_3$): δ 3.55 ppm (s, 9H, $Si(OCH_3)_3$), 1.26 to 0.50 ppm (m, 29H, $CH_3$, $CH_2$), 0.09 to 0.01 ppm (m, 12H, $Si(CH_3)_2O$).

Examples 1 to 3

Comparative Examples 1 to 3

Hydrosilylation Reaction Curing

First, each of the following components required to form compositions of the present invention were prepared.

(A) Organopolysiloxane
A-1: a dimethylpolysiloxane with both molecular chain terminals blocked with dimethylvinylsiloxy groups, and with a viscosity at 25° C. of 600 MPa·s
A-2: a dimethylpolysiloxane with both molecular chain terminals blocked with dimethylvinylsiloxy groups, and with a viscosity at 25° C. of 30,000 MPa·s (B) Wetter
B-1: an organosilicon compound (obtained in the synthesis example 2), represented by the formula shown below.

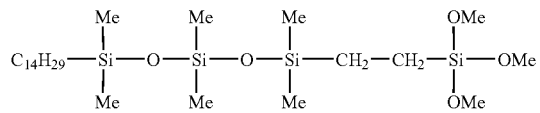

B-2: an organosilicon compound (obtained in the synthesis example 4), represented by the formula shown below.

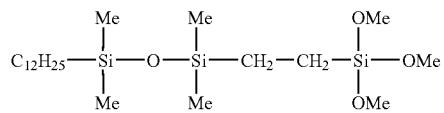

B-3 (for comparison): an organoalkoxysilane represented by the formula shown below.

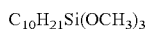

B-4 (for comparison): an organopolysiloxane represented by the formula shown below.

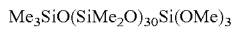

(C) Heat-Conductive Filler
C-1: aluminum powder (average particle size: 10.0 μm, the fraction that passed through a mesh size of 32 μm prescribed in JIS Z 8801-1)

C-2: aluminum powder (average particle size: 1.5 μm, the fraction that passed through a mesh size of 32 μm prescribed in JIS Z 8801-1)
C-3: zinc oxide powder (average particle size: 1.0 μm, the fraction that passed through a mesh size of 32 μm prescribed in JIS Z 8801-1)
C-4: a spherical alumina powder with an average particle size of 10 μm (product name: Admafine)® AO-41R, manufactured by Admatechs Co., Ltd.)
C-5: a spherical alumina powder with an average particle size of 0.7 μm (product name: Admafine AO-502, manufactured by Admatechs Co., Ltd.)

The average particle size values for the various components (C) represent volume-based cumulative average particle size values measured using a particle size analyzer Microtrac MT3300EX, manufactured by Nikkiso Co., Ltd. (this also applies to subsequent average particle size values).
(D) Hydrosilylation Reaction Curing Agent
D-1: an organohydrogenpolysiloxane represented by the formula shown below.

$$Me_3SiO(SiHMeO)_3(SiMe_2O)_{27}SiMe_3$$

D-2: an organohydrogenpolysiloxane represented by the formula shown below.

$$Me_3SiO(SiHMeO)_2(SiMe_2O)_{27}SiMe_3$$

D-3: an organohydrogenpolysiloxane represented by the formula shown below.

$$HMe_2SiO(SiMe_2O)_{18}SiMe_2H$$

D-4: a platinum catalyst (a solution of a chloroplatinic acid-vinylsiloxane complex (platinum atom content: 1% by mass) that uses the above component A-1 as a solvent
Other Components
Catalytic activity (reaction rate) retarder: a 50% by mass toluene solution of 1-ethynyl-1-cyclohexanol
[Method of Production]

The components (A) through (D) and the retarder described above were mixed together in the ratios (parts by volume) shown in Table 1 using the method described below, thereby forming compositions of examples 1 to 3, and comparative examples 1 to 3. In other words, the components (A) through (C) were first combined in a 5 liter planetary mixer (manufactured by Inoue Manufacturing Co., Ltd.), and in each case the resulting mixture was mixed for one hour at 70° C. Following cooling of the mixture to room temperature, the platinum catalyst of the component D-4 was added and mixed, the above retarder was then added and mixed, and finally, the organohydrogenpolysiloxanes of the components D-1 to D-3 were added and mixed, thereby yielding uniform heat-conductive silicone compositions.
[Test Methods]

The viscosity of the prepared compositions and the hardness and thermal conductivity of the cured products of those compositions were measured using the test methods described below. The results are shown in Table 1.
[Measurement of Viscosity]
Method of Measuring Compositions with a Viscosity of not More than 900 Pa·s The prepared composition was allowed to stand for 24 hours in a constant-temperature chamber at 25° C., and the viscosity (the initial viscosity) was then measured at a rotational velocity of 10 rpm using a viscometer (product name: Spiral Viscometer PC-1 TL, manufactured by Malcom Co., Ltd.).

Method of Measuring Compositions with a Viscosity Exceeding 900 Pa·s

The prepared composition was allowed to stand for 24 hours in a constant-temperature chamber at 25° C., and the viscosity was then measured at a rotational velocity of 5 rpm using a BS rotational viscometer (manufactured by Tokyo Keiki Co., Ltd.) and a rotor No. 7.
[Measurement of Hardness]

The prepared composition was subjected to die molding by heating at 120° C. for 30 minutes, thus forming a sheet with a thickness of 12 mm. Following cooling to 25° C., the initial Asker C hardness of the sheet was measured using an Asker C hardness meter manufactured by Ipros Corporation. Following measurement of the initial Asker C hardness, the sheet was left to stand for 500 hours at 125° C., and following subsequent cooling to 25° C., the Asker C hardness of the sheet was then re-measured using the same method.
[Measurement of Thermal Conductivity]

The prepared composition was cured by heating at 120° C. for 30 minutes to form a molded block with a thickness of 3 cm. The thermal conductivity of this block at 25° C. was then measured using a thermal conductivity meter (product name: QTM-500) manufactured by Kyoto Electronics Manufacturing Co., Ltd.

TABLE 1

| Composition Ratio | Example | | | Comparative Example | | |
| --- | --- | --- | --- | --- | --- | --- |
| (parts by volume) | 1 | 2 | 3 | 1 | 2 | 3 |
| A-1 | 100 | 100 | 50 | 100 | 100 | 100 |
| A-2 | | | 50 | | | |
| B-1 | 6 | | 6 | | | No component (B) |
| B-2 | | 6 | | | | |
| B-3 | | | | 6 | | |
| B-4 | | | | | 6 | |
| C-1 | 225 | 225 | | 225 | 225 | 225 |
| C-2 | 100 | 100 | | 100 | 100 | 100 |
| C-3 | 40 | 40 | | 40 | 40 | 40 |
| C-4 | | | 325 | | | |
| C-5 | | | 55 | | | |
| D-1 | 4.6 | 4.6 | | 4.6 | 4.6 | 4.6 |
| D-2 | | | 9.5 | | | |
| D-3 | 6.6 | 6.6 | | 6.6 | 6.6 | 6.6 |
| D-4 (platinum catalyst) | 0.15 | 0.15 | 0.4 | 0.15 | 0.15 | 0.15 |
| Retarder | 0.45 | 0.45 | 0.6 | 0.45 | 0.45 | 0.45 |
| Viscosity (Pa · s) | 304 | 325 | 1030 | 280 | (Note) | (Note) |

TABLE 1-continued

| Composition Ratio | Example | | | Comparative Example | | |
|---|---|---|---|---|---|---|
| (parts by volume) | 1 | 2 | 3 | 1 | 2 | 3 |
| Initial Asker C hardness | 14 | 16 | 45 | 12 | | |
| Asker C hardness after 500 hours at 125° C. | 18 | 22 | 53 | 67 | | |
| Thermal conductivity (W/mK) | 3.8 | 3.8 | 3.3 | 3.8 | | |

(Note):
Mixing all the components together yielded only a powder, and a paste could not be achieved.

From the results shown in Table 1 it is evident that despite the fact that the heat-conductive silicone compositions according to the present invention contain a high quantity of heat-conductive filler and exhibit a high thermal conductivity, they retain a comparatively low viscosity. Furthermore, it is also evident that changes over time in the hardness of the resulting cured products has also been suppressed, enabling a favorable level of flexibility to be maintained.

Examples 4 to 6

Comparative Examples 4 and 5

Condensation Reaction Curing

First, each of the following components required to form compositions of the present invention were prepared.
(A) Organopolysiloxane
A-3: an α,ω-dihydroxydimethylpolysiloxane with a viscosity at 25° C. of 700 mPa·s
(B) Wetter
B-1: an organosilicon compound (obtained in the synthesis example 2), represented by the formula shown below.

$$C_{14}H_{29}-\underset{\underset{Me}{|}}{\overset{\overset{Me}{|}}{Si}}-O-\underset{\underset{Me}{|}}{\overset{\overset{Me}{|}}{Si}}-O-\underset{\underset{Me}{|}}{\overset{\overset{Me}{|}}{Si}}-CH_2-CH_2-\underset{\underset{OMe}{|}}{\overset{\overset{OMe}{|}}{Si}}-OMe$$

B-2: an organosilicon compound (obtained in the synthesis example 4), represented by the formula shown below.

$$C_{12}H_{25}-\underset{\underset{Me}{|}}{\overset{\overset{Me}{|}}{Si}}-O-\underset{\underset{Me}{|}}{\overset{\overset{Me}{|}}{Si}}-CH_2-CH_2-\underset{\underset{OMe}{|}}{\overset{\overset{OMe}{|}}{Si}}-OMe$$

B-4 (for comparison): an organopolysiloxane represented by the formula shown below.

$$Me_3SiO(SiMe_2O)_{30}Si(OMe)_3$$

(C) Heat-Conductive Filler
C-6: a rounded alumina powder with an average particle size of 16 μm (product name: AS-30, manufactured by Showa Denko K.K.)
C-7: an alumina powder with an average particle size of 1 μm (product name: AL-47-1, manufactured by Showa Denko K.K.)
(D) Condensation Reaction Curing Agent
D-5: phenyltri(isopropenyloxy)silane
D-6: methyltrimethoxysilane Other Components
Catalyst-1: 1,1,3,3-tetramethyl-2-[3-(trimethoxysilyl)propyl]guanidinesiloxane
Catalyst-2: a titanium chelate catalyst (product name: Orgatix® TC-750, manufactured by Matsumoto Trading Co., Ltd.)
Adhesion Assistant-1: 3-aminopropyltriethoxysilane
[Method of Production]
The components (A) through (D) and the catalysts and adhesion assistant described above were mixed together in the ratios (parts by volume) shown in Table 2 using the method described below, thereby forming compositions of examples 4 to 6, and comparative examples 4 and 5. In other words, the components (A) through (C) were first combined in a 5 liter planetary mixer (manufactured by Inoue Manufacturing Co., Ltd.), and following mixing for 30 minutes at room temperature, the component (D), the catalyst and the adhesion assistant were added, and the resulting mixture was then mixed with defoaming for 30 minutes in an anhydrous environment, thereby yielding uniform heat-conductive silicone compositions.
[Test Methods]
The viscosity of the prepared compositions and the hardness and thermal conductivity of the cured products of those compositions were measured using the test methods described below. The results are shown in Table 2.
[Measurement of Viscosity]
The prepared composition was allowed to stand for 24 hours in a constant-temperature chamber at 25° C., and the viscosity was then measured at a rotational velocity of 20 rpm using a BS rotational viscometer (manufactured by Tokyo Keiki Co., Ltd.) and a rotor No. 7.
[Measurement of Hardness]
The prepared composition was cured over 7 days in an environment at 23±2° C. and 50±5% RH to form a sheet with a thickness of 6 mm, and the hardness of this sheet was then measured using a durometer type A hardness meter.
[Measurement of Thermal Conductivity]
The prepared composition was cured over 14 days in an environment at 23±2° C. and 50±5% RH to form a molded block with a thickness of 3 cm, and the thermal conductivity of this block at 25° C. was then measured using a thermal conductivity meter (product name: QTM-500) manufactured by Kyoto Electronics Manufacturing Co., Ltd.

TABLE 2

| Composition Ratio | Example | | | Comparative Example | |
|---|---|---|---|---|---|
| (parts by volume) | 4 | 5 | 6 | 4 | 5 |
| A-3 | 100 | 100 | 100 | 100 | 100 |
| B-1 | 3 | | 3 | | No component (B) |
| B-2 | | 3 | | | |
| B-4 | | | | 3 | |
| C-6 | 160 | 160 | 160 | 160 | 160 |

TABLE 2-continued

| Composition Ratio | Example | | | Comparative Example | |
|---|---|---|---|---|---|
| (parts by volume) | 4 | 5 | 6 | 4 | 5 |
| C-7 | 80 | 80 | 80 | 80 | 80 |
| D-5 | 16.8 | 16.8 | | 16.8 | 16.8 |
| D-6 | | | 7 | | |
| Catalyst-1 | 0.8 | 0.8 | | 0.8 | 0.8 |
| Catalyst-2 | | | 2 | | |
| Adhesion assistant-1 | 1 | 1 | 0.2 | 1 | 1 |
| Viscosity (Pa · s) | 87 | 98 | 112 | 191 | 360 |
| Initial hardness (Type A durometer) | 88 | 89 | 90 | 92 | 93 |
| Thermal conductivity (W/mK) | 2.5 | 2.5 | 2.7 | 2.5 | 2.4 |

From the results shown in Table 2 it is evident that despite the fact that the heat-conductive silicone compositions according to the present invention contain a high quantity of heat-conductive filler and exhibit a high thermal conductivity, they retain a comparatively low viscosity.

Examples 7 and 8

Comparative Examples 6 to 8

Free Radical Reaction Curing

First, each of the following components required to form compositions of the present invention were prepared.
(A) Organopolysiloxane
A-4: a dimethylpolysiloxane with both molecular chain terminals blocked with dimethylvinylsiloxy groups, and with an average polymerization degree of 8,000.
A-5: a dimethylpolysiloxane with both molecular chain terminals blocked with trimethylsiloxy groups, and with a viscosity at 25° C. of 1,000 mPa·s.
(B) Wetter
B-1: an organosilicon compound (obtained in the synthesis example 2), represented by the formula shown below.

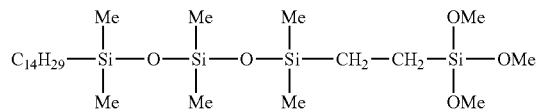

B-2: an organosilicon compound (obtained in the synthesis example 4), represented by the formula shown below.

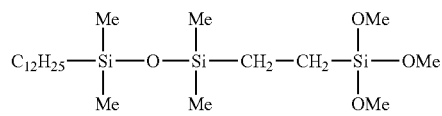

B-4 (for comparison): an organopolysiloxane represented by the formula shown below.

$Me_3SiO(SiMe_2O)_{30}Si(OMe)_3$

B-5 (for comparison): an α,ω-dihydroxydimethylpolysiloxane
(C) Heat-Conductive Filler
C-4: a spherical alumina powder with an average particle size of 10 μm (product name: Admafine AO-41R, manufactured by Admatechs Co., Ltd.)

C-5: a spherical alumina powder with an average particle size of 0.7 μm (product name: Admafine AO-502, manufactured by Admatechs Co., Ltd.)
(D) Free Radical Reaction Curing Agent
D-7: 2,5-dimethyl-2,5-di(t-butylperoxy)hexane
[Method of Production]

The components (A) through (D) were mixed together in the ratios (parts by volume) shown in Table 3 using the method described below, thereby forming compositions of examples 7 and 8, and comparative examples 6 to 8. In other words, the components (A) through (C) were first combined in a 5 liter kneader (manufactured by Inoue Manufacturing Co., Ltd.), and in each case the resulting mixture was mixed for one hour under heating at 170° C. to form a base composition. Following cooling of this base composition to room temperature, a two-roll mill was used to add and mix the component (D), thereby yielding millable heat-conductive silicone compositions.
[Test Methods]

The plasticity of the prepared base compositions and the hardness and thermal conductivity of the cured products of those compositions were measured using the test methods described below. The results are shown in Table 3.
[Measurement of Plasticity]

The plasticity of the prepared base composition was measured at 25° C. in accordance with JIS K 6249, using a parallel plate plastometer (a Williams' plastometer).
[Measurement of Hardness]

The prepared composition was subjected to die molding under conditions including a temperature of 165° C. and a pressure of 50 kgf/cm², and was then subjected to a heat treatment for 4 hours in a dryer at 200° C. to form a sheet with a thickness of 6 mm. The hardness of this sheet was then measured using a durometer type A hardness meter.
[Measurement of Thermal Conductivity]

The prepared composition was subjected to die molding under conditions including a temperature of 165° C. and a pressure of 50 kgf/cm², and was then subjected to a heat treatment for 4 hours in a dryer at 200° C. to form a molded block with a thickness of 3 cm. The thermal conductivity of this block at 25° C. was then measured using a thermal conductivity meter (product name: QTM-500) manufactured by Kyoto Electronics Manufacturing Co., Ltd.

TABLE 3

| Composition Ratio | Example | | Comparative Example | | |
|---|---|---|---|---|---|
| (parts by volume) | 7 | 8 | 6 | 7 | 8 |
| A-4 | 90 | 90 | 90 | 90 | 90 |
| A-5 | 10 | 10 | 10 | 10 | 10 |
| B-1 | 5 | | | | No |
| B-2 | | 5 | | | component |
| B-4 | | | 5 | | (B) |
| B-5 | | | | 5 | |
| C-4 | 245 | 245 | 245 | 245 | 245 |
| C-5 | 60 | 60 | 60 | 60 | 60 |
| D-7 | 0.5 parts by mass per 100 parts by mass of the above base composition | | | | |
| Plasticity (3 minutes) | 280 | 323 | 650 | 730 | (Note) |
| Initial hardness (Type A durometer) | 83 | 85 | 89 | 93 | |
| Thermal conductivity (W/mK) | 3.0 | 3.0 | 2.9 | 2.8 | |

(Note):
Mixing all the components together yielded only a powder, and a paste could not be achieved.

From the results shown in Table 3 it is evident that despite the fact that the heat-conductive silicone compositions according to the present invention contain a high quantity of heat-conductive filler and exhibit a high thermal conductivity, the plasticity is comparatively low.

What is claimed is:

1. A heat-conductive silicone composition, comprising:
   (A) 100 parts by volume of an organopolysiloxane represented by an average composition formula (1) shown below:

$$R^1_a SiO_{(4-a)/2} \qquad (1)$$

(wherein, $R^1$ represents identical or different, unsubstituted or substituted monovalent hydrocarbon groups of 1 to 18 carbon atoms, and a represents a number within a range from 1.8 to 2.2),
   (B) 0.1 to 50 parts by volume of an organosilicon compound represented by a general formula (2) shown below:

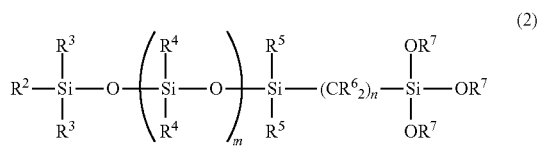

(wherein, $R^2$ represents an unsubstituted or substituted alkyl group, alkenyl group or aryl group, wherein a number of carbon atoms within $R^2$ is within a range from 6 to 30, each $R^3$ represents, independently, an unsubstituted or substituted alkyl group, alkenyl group or aryl group, $R^4$ and $R^5$ each represent identical or different, unsubstituted or substituted monovalent hydrocarbon groups, and numbers of carbon atoms within $R^3$, $R^4$ and $R^5$ are independently, within a range from 1 to 8, each $R^6$ represents, independently, a hydrogen atom, or an unsubstituted or substituted monovalent hydrocarbon group, each $R^7$ represents, independently, an unsubstituted or substituted alkyl group, alkoxyalkyl group, alkenyl group or acyl group, m represents an integer from 2 to 4, and n represents an integer from 2 to 20),
   (C) 100 to 2,500 parts by volume of a heat-conductive filler, and
   (D) an effective quantity of a curing agent.

2. The composition according to claim 1, wherein the component (C) is aluminum, silver, copper, nickel, zinc oxide, aluminum oxide, silicon oxide, magnesium oxide, aluminum nitride, boron nitride, silicon nitride, silicon carbide, diamond, graphite, carbon nanotubes, metallic silicon, carbon fiber, fullerene, or a combination thereof, and an average particle size of the component (C) is within a range from 0.1 to 50 μm.

3. The composition according to claim 1, wherein the curing agent of component (D) is one or more curing agents selected from the group consisting of hydrosilylation reaction curing agents, condensation reaction curing agents, and free radical reaction curing agents.

4. The composition according to claim 3, wherein the component (D) is a hydrosilylation reaction curing agent, and the hydrosilylation reaction curing agent comprises an organohydrogenpolysiloxane containing an average of two or more silicon atom-bonded hydrogen atoms within each molecule, and a platinum group metal-based catalyst.

5. The composition according to claim 3, wherein the component (D) is a condensation reaction curing agent, and the condensation reaction curing agent comprises a silane containing at least two hydrolyzable groups bonded to silicon atoms within each molecule and/or a partial hydrolysis-condensation product thereof.

6. The composition according to claim 3, wherein the component (D) is a free radical reaction curing agent, and the free radical reaction curing agent comprises an organic peroxide.

7. A heat-conductive silicone cured product obtained by curing the composition defined in claim 1.

8. A method for dissipating heat generated by a heat-generating electronic component into a heat-radiating component, comprising the steps of:
   applying the cured product according to claim 7 to a surface of the heat-generating electronic component, and
   mounting the heat-radiating component on the applied cured product to sandwich the cured product between the heat-generating electronic component and the heat-radiating component, thereby dissipating the heat into the heat-radiating component.

* * * * *